United States Patent

[11] 3,628,632

| [72] | Inventor | Frank Lambert |
| | | Bay St., Box 85, Osterville, Mass. 02655 |
| [21] | Appl. No. | 849,311 |
| [22] | Filed | Aug. 12, 1969 |
| [45] | Patented | Dec. 21, 1971 |

[54] AUTOMATIC CHECKOUT COUNTER
10 Claims, 10 Drawing Figs.

[52] U.S. Cl. ..................................... 186/1 A, 53/384, 186/1 AC
[51] Int. Cl. ..................................... E04h 3/04
[50] Field of Search ........................... 186/1, 1.1, 1.1 C; 53/384

[56] References Cited
UNITED STATES PATENTS

| 3,028,931 | 4/1962 | Donovan | 186/1.1 C |
| 3,062,324 | 11/1962 | Hennion | 186/1.1 |
| 3,480,114 | 11/1969 | Shoffner | 186/1.1 C |

FOREIGN PATENTS

| 678,844 | 1/1964 | Canada | 186/1.1 |
| 6,804,431 | 10/1968 | Netherlands | 186/1.1 |

Primary Examiner—Harvey C. Hornsby
Attorney—Wolf, Greenfield and Sacks

ABSTRACT: An automatic checkout system for supermarkets and the like in which shopping carts are sequentially and automatically unloaded by an elevator mechanism. The articles in the cart are placed on a carousel-style conveyor by the operator and are moved by the carousel to a bag-loading station having means for automatically supplying open bags to receive the articles which are fed automatically from the carousel to the bag. Means are provided for conveying the bags to a storage or pickup area.

INVENTOR
FRANK LAMBERT

INVENTOR
FRANK LAMBERT
BY,
Wolf Greenfield Hieken + Sacks
ATTORNEYS

AUTOMATIC CHECKOUT COUNTER

SUBJECT MATTER OF INVENTION

The present invention relates to an automatic checkout system designed primarily for use in supermarkets and like retail operations.

BACKGROUND OF INVENTION

The conventional checkouts systems used today in supermarkets and like retail operations ordinarily comprise an elongated counter usually having a conveyor extending lengthwise of the counter that is either continuously operating or is selectively operated by the checkout personnel. An enlarged surface area on the counter in series with the conveyor and frequently slightly inclined and enclosed is used for hand packing the articles carried past the checkout personnel.

Such systems especially in times of peak store operation require two people, including one for handling the articles as they pass the checkout point and a second for bundling the articles after they have been checked out. In addition, the customer usually has to hand unload the shopping cart. Such systems are unsatisfactory. Not only do they involve the time of three people in unloading the shopping cart, checking, and repackaging articles, but also, such systems increase the probability of breakage and damage to the articles being handled. In addition, the systems which have been used heretofore are deficient in that the handling of a single article by three people often results in improper checking or totalization of the articles being processed. Thus, for example, a clerk may easily miss ringing up a particular article on a cash register when the article is being loaded by a customer. Further, in some systems orders of successive customers can easily be confused and mixed. This often occurs because a successive customer's orders or groups of articles are ordinarily separated if at all by a stick, which the customer places on the conveyor belt after unloading his shopping cart. These sticks are small and are often not noticed as the conveyor moves down the counter, thus permitting accidental mixing of successive orders.

SUMMARY OF INVENTION

The foregoing limitations of existing checkout systems for retail operations are overcome by the present invention. In the present invention there is provided an automatic checkout system designed especially for supermarkets and like retail operations in which the handling of articles by the customer and store personnel is minimized and ordinarily will be handled from unloading of the cart to bagging by a single checkout employee who also can totalize the sale. In the present invention, the checkout operator handles all items, relieving the customer of the task of unloading a shopping cart and eliminating the necessity of a bundling clerk, thereby effecting a savings of time, minimizing the likelihood of damage to articles, inadvertent nonregistering or accounting of articles or the omission of an article from the final package. This system provides a financial savings as well as time savings both to customer and to store operator. Customers spend less time in checkout lines, confusion is reduced, the number of bundle clerks is minimized. The increased speed of handling may reduce the total number of checkout counters required, thus increasing the floor space available for sales purposes. Bundling is more efficient, and the total number of bags used for a given number volume of business may be minimized. Single or double bags may be used selectively.

A further object of the present invention is to provide an improved automatic checkout system having means for automatically delivering articles in a shopping cart to a checkout counter and thence to a checking station and subsequently to a bagging station with the system preferably providing means for simultaneously checking and bagging successive orders or groups of articles. A further object of the present invention is to provide an improved means for conveying articles from a checking to a bagging station and for automatically bagging a group of articles which have been checked. One more object of the present invention is to provide an improved means for opening and aligning a bag for receiving checked articles at a bagging station. A further object of the present invention is to provide automatic means for receiving, opening, loading, and removing bags with the bags containing loaded articles stored on a suitable storage area.

In the present invention there is provided an automatic checkout and packaging system for groups of articles such as groceries and the like which vary in shape, size, and weight. This system includes means for receiving a group of articles which may comprise a liner for a shopping cart, means for positioning the receiving means for individual checking by checkout personnel, and for transfer to a compartment. The compartment is designed for movement from the checking position in which the group of articles are placed in the compartment to a bundling position. Preferably, the compartment is one of several formed on a carousel for successive sequential movement of groups of articles. Means are provided for supporting a removable container, preferably in the form of a bag or carton, at a bundling position to receive groups of articles from the compartment as it moves to bundling position from the checking position. Means are provided for inserting or feeding the group of articles from the compartment into the removable container and thence for removing the container and storing it.

DESCRIPTION OF DRAWINGS

The foregoing objects and advantages of the present invention will be more clearly understood when considered in conjunction with the accompanying drawings in which.

Figure 1:
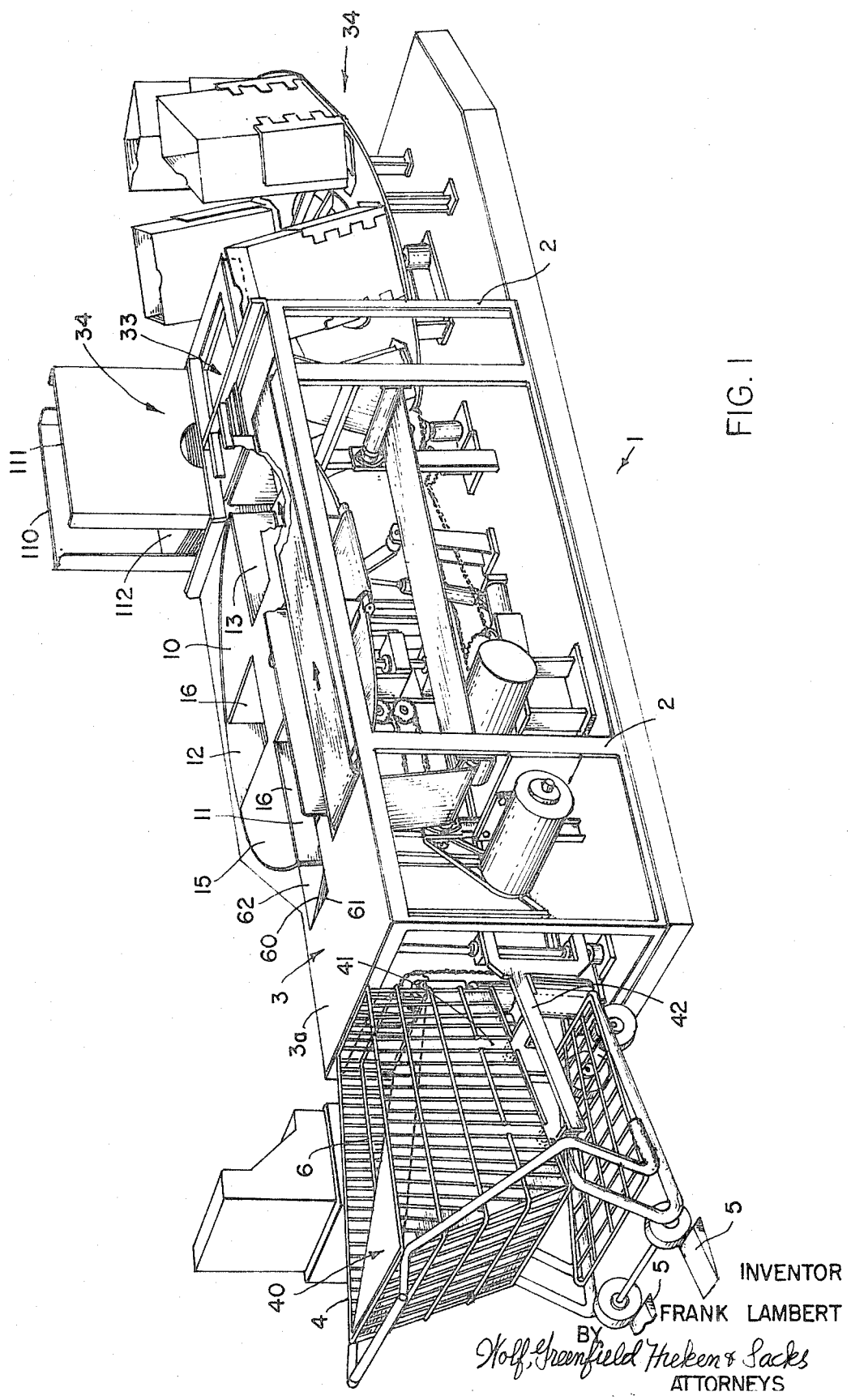
FIG. 1 is a perspective view of the checkout counter embodying the invention.

DETAILED DESCRIPTION OF PREFERRED EMBODIMENTS referring to FIG. 1, there is shown the principle components of the checkout counter 1 having a series of frames 2 that extend vertically to support an upper platform 3. The forward end of this upper platform is used to receive groceries that a customer will normally deliver to the checkout counter in cart 4. The cart 4 is preferably a wheeled vehicle that may be secured temporarily against the forward end of the checkout counter by a series of blocks 5 that engage the rear wheels of the cart so as to prevent it from being accidentally moved during unloading.

Figure 3:
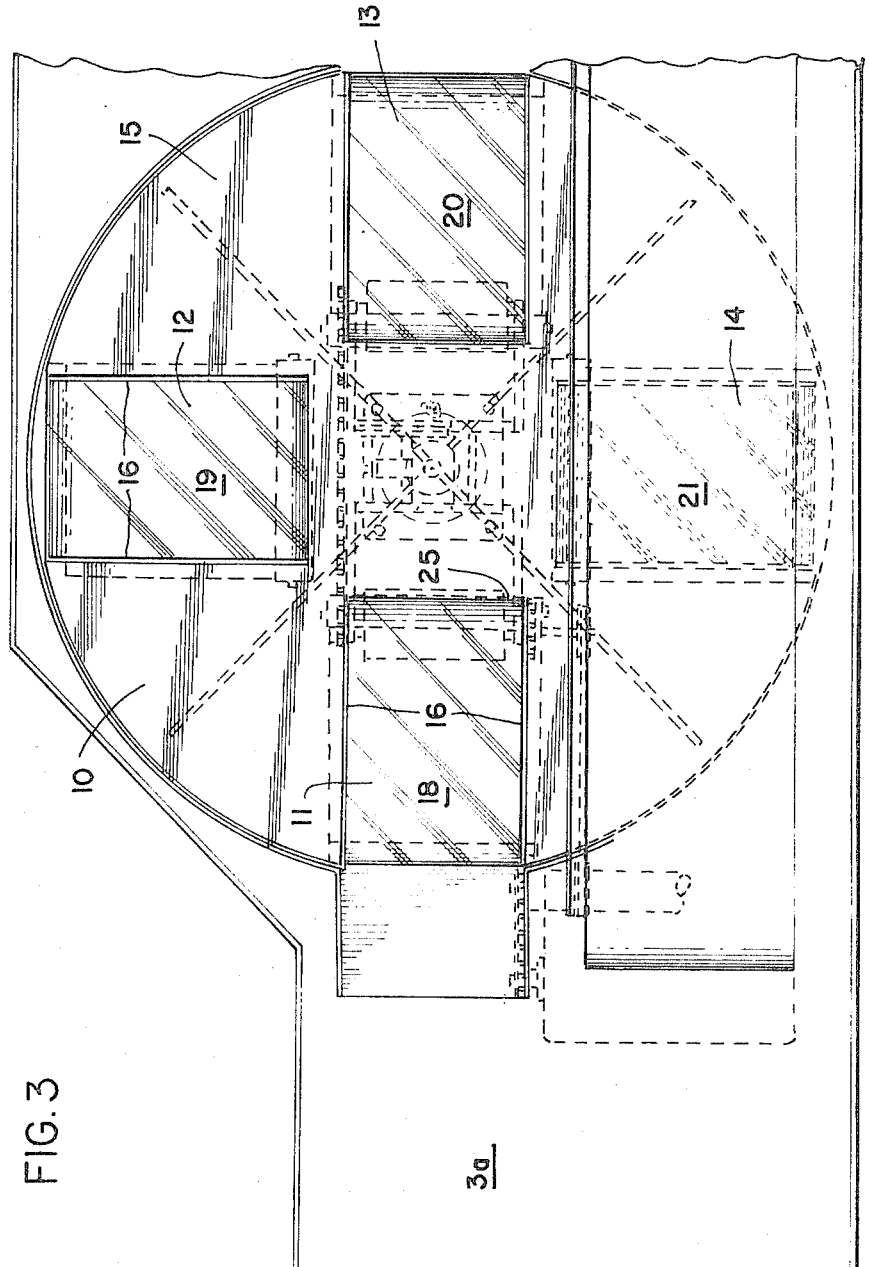
FIG. 3 is a fragmentary top view of a loading station of FIG. 1.

This cart 4 is provided preferably with an inner liner or basket 6 (FIG. 1) that is designed to be raised and lowered in a manner hereafter described so as to horizontally align the groceries carried within the cart with the upper surface 3. Centrally located in the checkout counter is a carousel 10. This carousel is provided with four recesses 11, 12, 13 and 14. (See FIG. 3.) The upper surface 15 of the carousel is coplanar with the upper surface 3. The sidewalls 16 of the recesses extend 90° angularly downwardly from surface 15 and terminates at their bottom ends in bottoms 18, 19, 20, 21. These bottoms are all formed by a series of endless belts with one set of endless belts for each of the recesses. Thus, for example, bottom 18 is formed by the endless belt 18 (See FIG. 4) that is journaled at the ends of the recess 11 on rolls 18B and 18C. The inner roll 18C, which is parallel to roll 18B, has a diameter greater than roll 18B. The sidewalls 16 of these recesses are interconnected at their inner end by an end wall 25. The carousel is rotated by a drive mechanism generally indicated at 30 in FIG. 4. To the rear of the carousel is a bag feed mechanism 31 that is designed to feed bags singularly from a magazine to the counter. A bag opening means generally illustrated at 33 is positioned to receive the bag singularly and open them for receiving grocery articles from the carousel.

A delivery carousel 34 is designed to receive successive bags filled with groceries for unloading.

Figure 2:
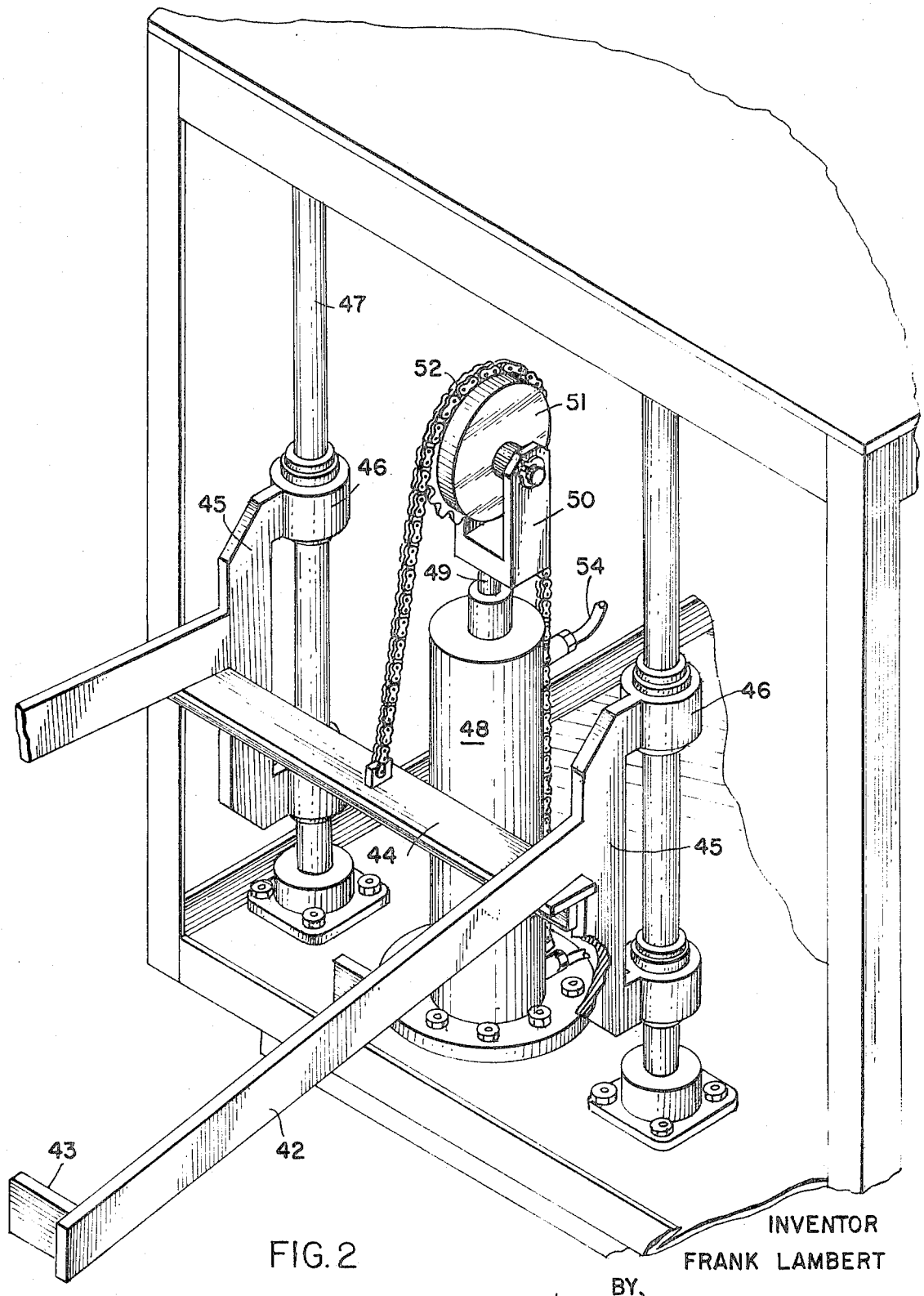
FIG. 2 is a fragmentary perspective view of a lift mechanism at the forward end of the checkout counter.

Now referring to the details of the principle components briefly described above, in fig. 2, there is shown a mechanism for use with the modified cart illustrated in FIG. 1 for automatically unloading this cart. The cart, which contains an inner liner 40, (FIG. 1), is provided with a slot 41 that permits an arm 42 of the mechanism (FIG. 2) to move upwardly into engagement with the liner 40. The arm 42 is provided with inwardly extending flanges or lips 43 that are designed to engage he underside of the liner 40 and raise it upwardly at least to the level of the counter 3. This mechanism is thus used to raise the liner 40 almost to the height of the surface 3 so that the operator may easily lift it the rest of the way from the cart onto the surface 3. The arms 42 are rigidly interconnected by a connecting web 44. The arms 42 and web 44 are supported rigidly on brackets 45 that in turn are provided with journals 46 for vertical movement of the lifting assembly on the cylindrical rails 47. A hydraulic cylinder 48 having a shaft 49 on which is supported a bracket 50 in turn supporting a sprocket wheel 51 is provided for lifting purposes. The sprocket wheel 51 engages a chain 52 that has one end connected to the web 44 and the other end connected or anchored to the base of the checkout counter. Thus, by an introduction of a hydraulic fluid through the tube 54, the shaft 49 is raised, in turn causing the lifting mechanism to be raised on rotation of the sprocket 51.

Figure 4:
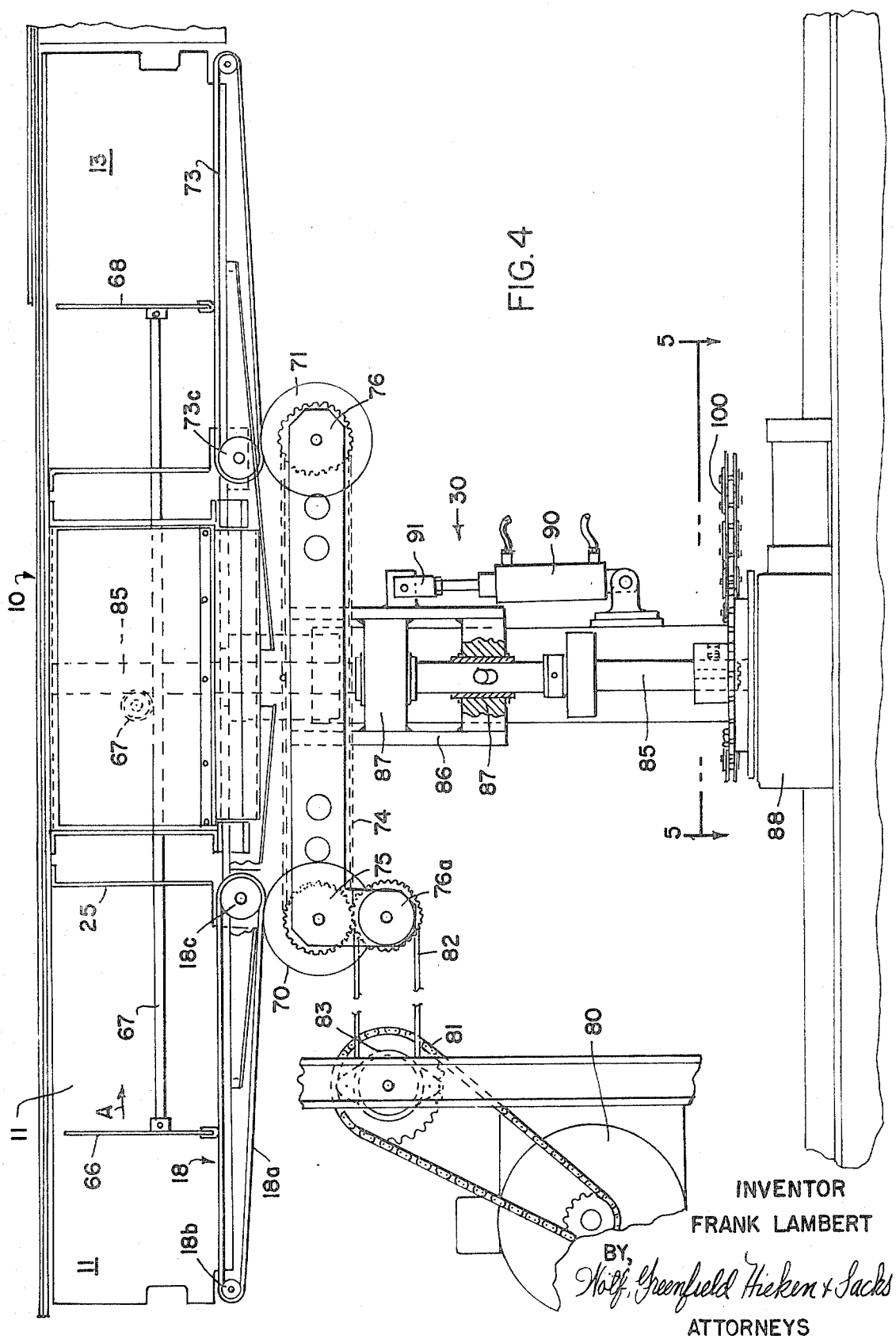
FIG. 4 is a fragmentary cross-sectional elevation showing the mechanism for driving the feed belts.

The groceries or other articles which are unloaded on the surface 3A are placed by an operator in the recess of the carousel 10 that is in a forward position. In the embodiment illustrated in FIG. 1 this is recess 11. When in this position, recess 11 is aligned with recess 60 in the table. Recess 60 is formed with an inclined wall 61 (FIG. 1) down which articles may roll into recess 11 of the carousel 10. Suitable sidewalls 62 are provided in the recess 60 for alignment with the sidewalls 16 of the recess 11. The groceries which roll down to recess 11 are moved rearwardly by a belt 18 by a mechanism hereafter described. As the belt moves rearwardly, the articles push against movable wall 66 (FIG. 4). This movable wall is supported for rearward movement on a shaft 67 that extends through the carousel and terminates in recess 13 with a like movable wall 68. Thus, on movement of the wall 66 in the direction of arrow A there will be a like movement of wall 68 in recess 13. The shaft 67 is suitably journaled for such axial movement. The purpose of the walls 66 and 68 is to assure movement from the recess 13 in an unloading position of all of the articles that have been placed in it before further rotation of the carousel is permitted. A similar wall arrangement is provided between recesses 12 and 14. The wall 68 is the recess at the unloading position (recess 13 is in the unloading position as illustrated in the drawings) trips a microswitch (not shown) at its rearmost position. Unless this microswitch is tripped, the operator cannot rotate the carousel to a subsequent station.

The belts in the recesses in the forward and rear positions of rotation of the carousel are moved rearwardly. The belts in the recesses in the side positions are not moved. In the arrangement illustrated, the recesses 11 and 13 are provided with means for movement of the upper surface of the belts rearwardly, while the belts of recesses 12 and 14 do not move.

This drive means is best illustrated in FIG. 4. In this arrangement friction rolls 70 and 71 suitably mounted on the frame are in tangential engagement with the belts 18 of recess 11 and 13 at points below the rolls 18C and 73C. These friction drive rolls 70 and 71 are commonly driven by a chain 74, in turn mounted or secured to sprockets 75 and 76, respectively keyed to the drive rolls 70 and 71. The sprocket 75 is a double sprocket with one-half of the sprocket interengaging sprocket 76A in turn driven by motor 80 through chains 81, 82, and interconnecting sprocket means 83. These sprockets may be suitably supported on shafts in turn secured to the frame of the machine. The carousel is mounted for rotation on the shaft 85, which is suitably supported in journals. The lower end of the shaft 85 is keyed to an indexing motor 88 that is designed to rotate the shaft intermittently over 90° arcs. Coaxially supported on the shaft 85 and spaced from it by journals 87 is a frame 86 that supports the drive rolls 70 and 71. This frame 86 is designed to be moved vertically relative to shaft 85 for disengagement of the roll 70 and 71 from the belts 18 forming the bottom of the recesses whereby the carousel may be free to rotate after loading and unloading operations. A hydraulic cylinder 90 supported on the frame 86 is provided for such lifting action. One end of the hydraulic cylinder 90 is secured to the frame of the checkout counter and the other end 91 is pivotally secured to the frame 86. The vertical motion of this frame 86 may for example be in the order of one-half an inch and should be sufficient merely to disengage the rolls 70 and 71 from the belts which they will otherwise drive.

Figure 5:
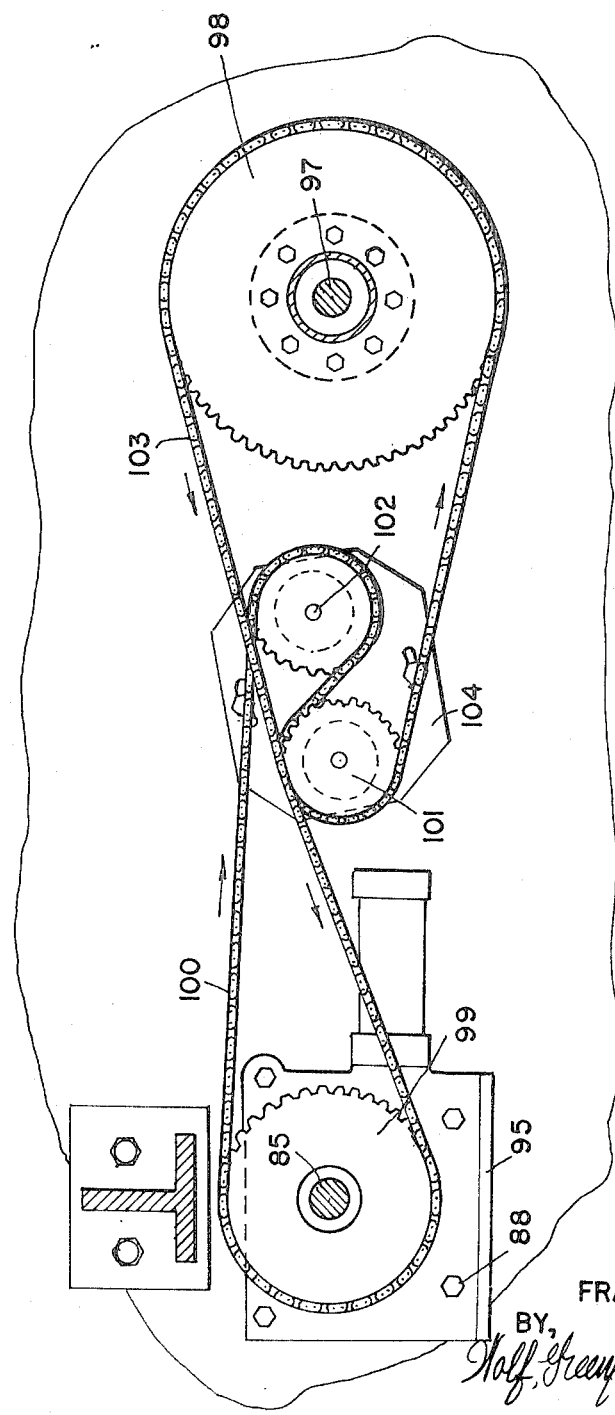
FIG. 5 is a cross-sectional view of a part of a drive mechanism taken along a line 5—5 partially shown in FIG. 4.

The indexing motor 88 (FIG. 5) which is suitably supported on the base 95 and is also used to drive the delivery carousel 34 (FIG. 1). In this arrangement, the delivery carousel is supported on the shaft 97 that carries the sprocket 98. The shaft 85 in turn carries a sprocket 99. Intermediate the sprockets 99 and 98 are a pair of sprocket means 101, 102. Sprocket means 102 is a single sprocket, while sprocket means 101 comprises double coaxially mounted sprockets. Chain 100 interengages and is looped about sprocket 99 and sprocket 102, so that sprocket 102 rotates in the same direction as sprocket 99. The lower sprocket of the sprocket means 101 is interengaged for movement in the same direction as sprocket 98 by chain 103, which is looped about this lower sprocket of the sprocket means 101 and about the sprocket 98. The upper sprocket of the sprocket means 101 is interengaged with the outside of chain 100 so that motion of the chain 100 is transmitted to the sprocket means 101 and thence to the sprocket 98. This arrangement provides for rotation of the sprocket 98 in a direction opposite to the sprocket 99. By proper selection of the size of the sprockets intermittent rotation may be obtained in the sprocket 98 of 60° upon incremental movement of the sprocket 99.

Groceries and other articles deposited in the recess in a position illustrated by recess 11 are rotated clockwise, as illustrated in fig. 1, to the intermediate position as illustrated by the recess 12 and thence after unloading of the recess in the position of recess 13 to a position of the recess 13. The articles in the recess 13 are unloaded by the operator when the belt 73 is moved rearwardly under the force provided by drive rolls 71. The articles are unloaded into a bag in the position illustrated at 107 in FIG. 6. The bag illustrated in FIG. 6 in dotted outline has been delivered from the bag magazine 31 and has been opened by suitable mechanisms herein described.

Figure 6:
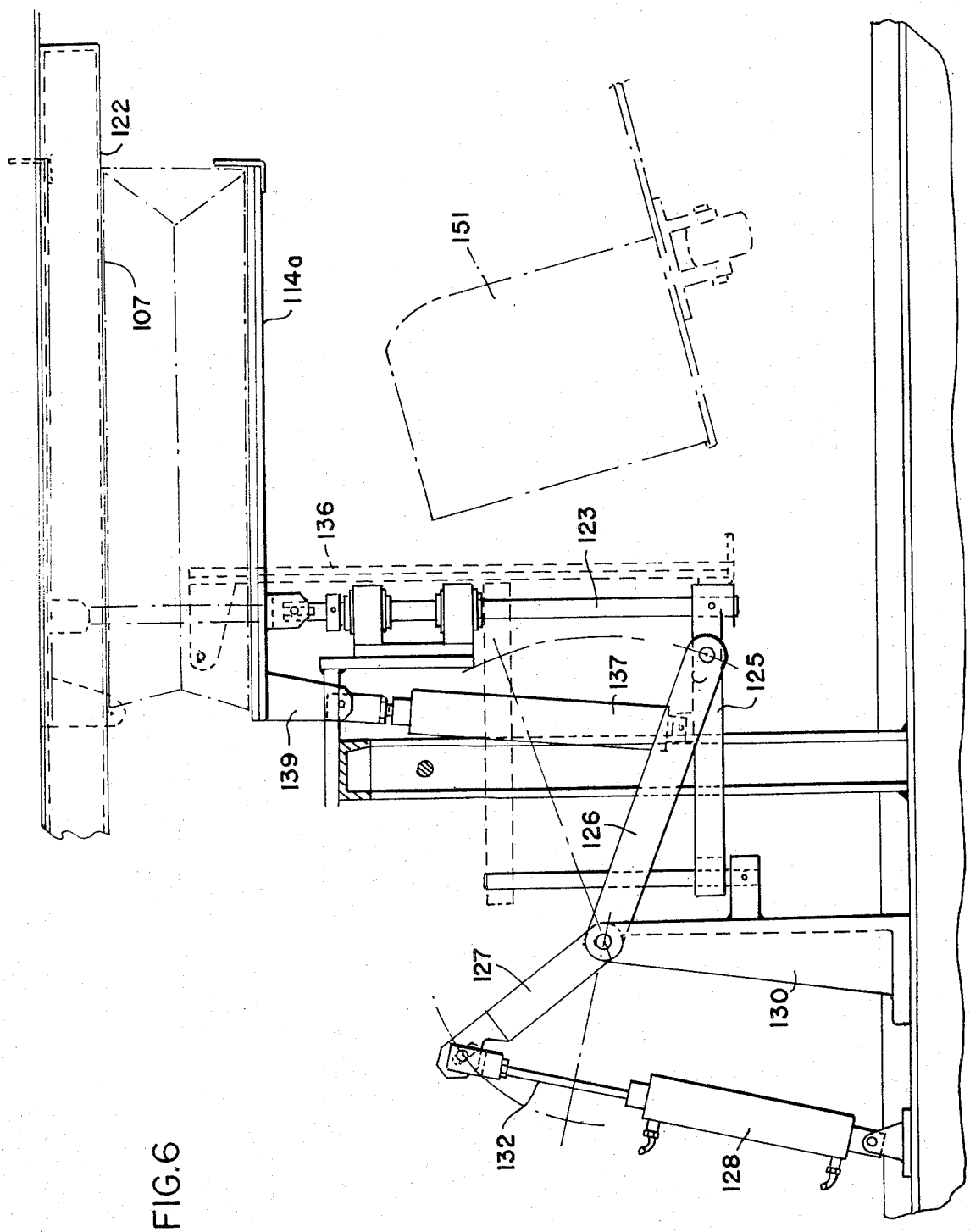
FIG. 6 is a fragmentary elevation of a mechanism for feeding and opening bags.
Figure 7:
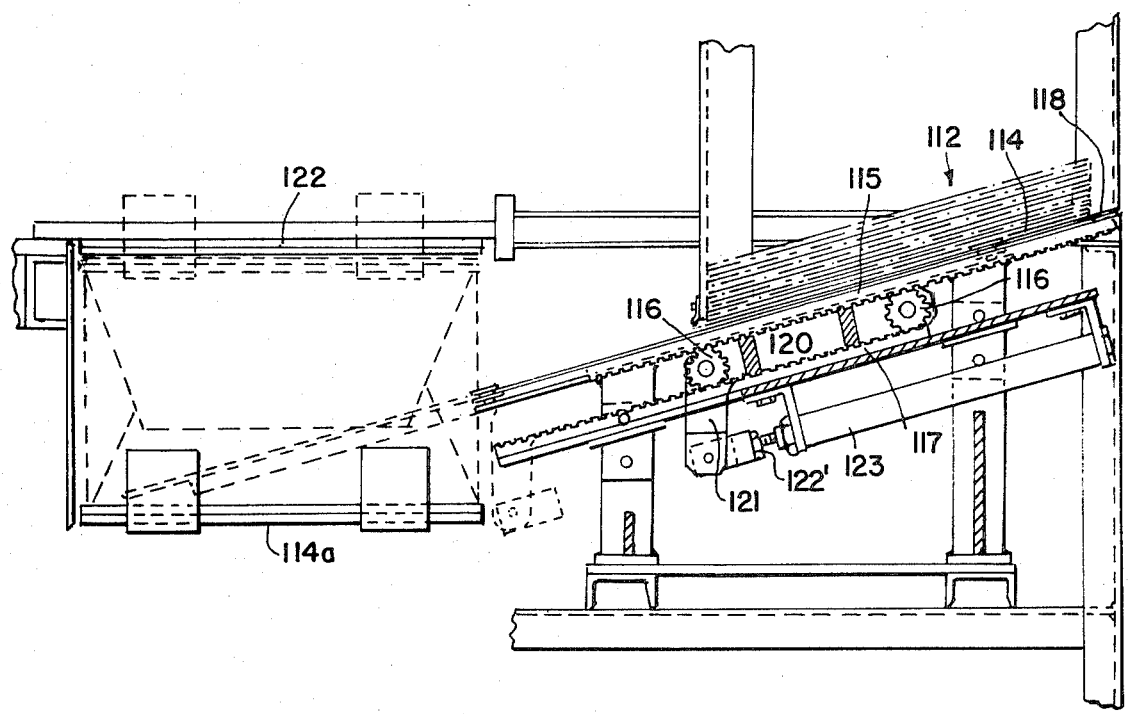
FIG. 7 is a cross-sectional elevation of the bag feed mechanism.
Figure 8:
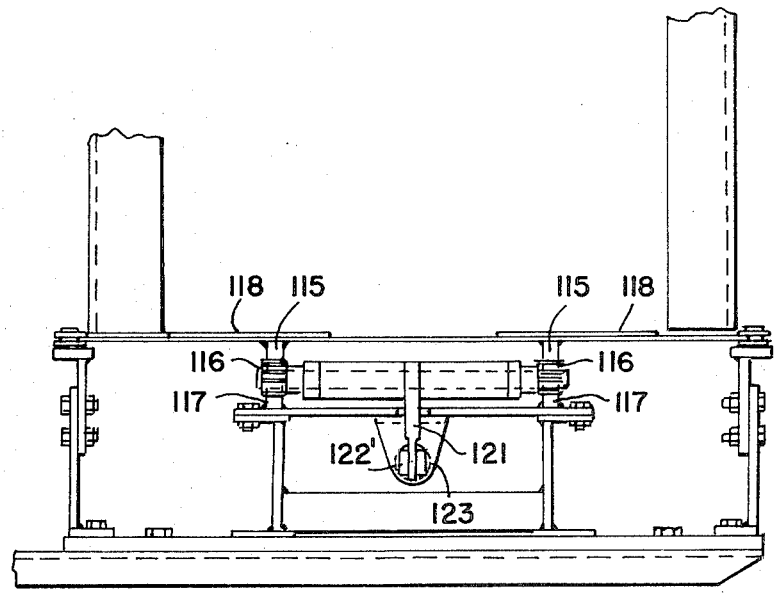
FIG. 8 is a cross-sectional elevation looking substantially from the right of FIG. 7.

The bag magazine 31 consists essentially of vertical walls 110 and 111 (FIG. 1) spaced apart and shaped to receive a stack of bags. The lowermost bag of the stack 112 is removed from the stack and deposited on platform 114A by mechanisms best illustrated in FIG. 7. In this arrangement the stack of bags rest on an inclined flat plate 114 that is supported at its side by an elongated rack 115. The rack 115 engages a pair of sprockets 116 in turn supported at their bottom end by a lower rack 117. The plate 114 is provided with a very small lip or catch 118 that is designed to engage the upper or outer edge of the lowermost bag and cause it to move relative to the stack down the incline towards the platform 114A. The sprockets 116 are supported on a bracket for uniform movement. This bracket 120 in turn is connected by a web 121 to the piston 122' of the hydraulic cylinder 123A in turn mounted on the frame. Actuation of the cylinder 123A causes an inclined downward movement of the plate 114 carrying the lowermost bag 112 with it, with this lowermost bag having been engaged at its upper edge by the bracket 118. The bag is moved downwardly to the upper surface of the platform 114A where the bag is sandwiched between platform 114A and upper member 122. Member 114A and member 122 are both vacuum plates. Essentially, they consist of manifolds having facing openings through which air is adapted to be drawn. Thus, when a bag such as bag 107 (FIG. 6) is positioned between these manifold members and a section is applied to them the walls of the bag are drawn in opposite directions toward the manifold members 122 and 114A. The lowermost member of platform 114A is supported for vertical movement so that when a bag 107 is positioned between it and member 122 downward movement of the member 114A will cause the bag to open. Means for drawing the member 114A downwardly is best illustrated in FIG. 6. In this arrangement, the member is supported for vertical movement on the shaft 123. In its initial movement, the shaft 123 is raised so that the bag 107 is squeezed between the members 114A and 122, thus effectively causing the suction through both of these members to be applied to the upper wall of the bag. In a sequential movement, the member 114A moves downwardly, thus causing the bag to open. A means for actuating this mechanism includes the linkage shown in FIG. 6. In this arrangement, the shaft 123 is supported at its lower end by elevator means 125. A leverage system including link 126 and 127 is connected to a hydraulic lift means 128. The link 126 and 127 rigidly are secured together and are pivotally supported at their interengaged ends by a pin 129 in turn supported on a support means 130. The other end of link 126 is loosely coupled to the elevator means 125, while the other end of link 127 is pivotally connected to the shaft 132 of the hydraulic means 128. Thus, by actuation of the hydraulic means 128, the links 127 and 126 may be rotated in a counterclockwise direction, as viewed in FIG. 6, to lift the member 114A or in a clockwise direction to lower the member 114A.

Figure 9:
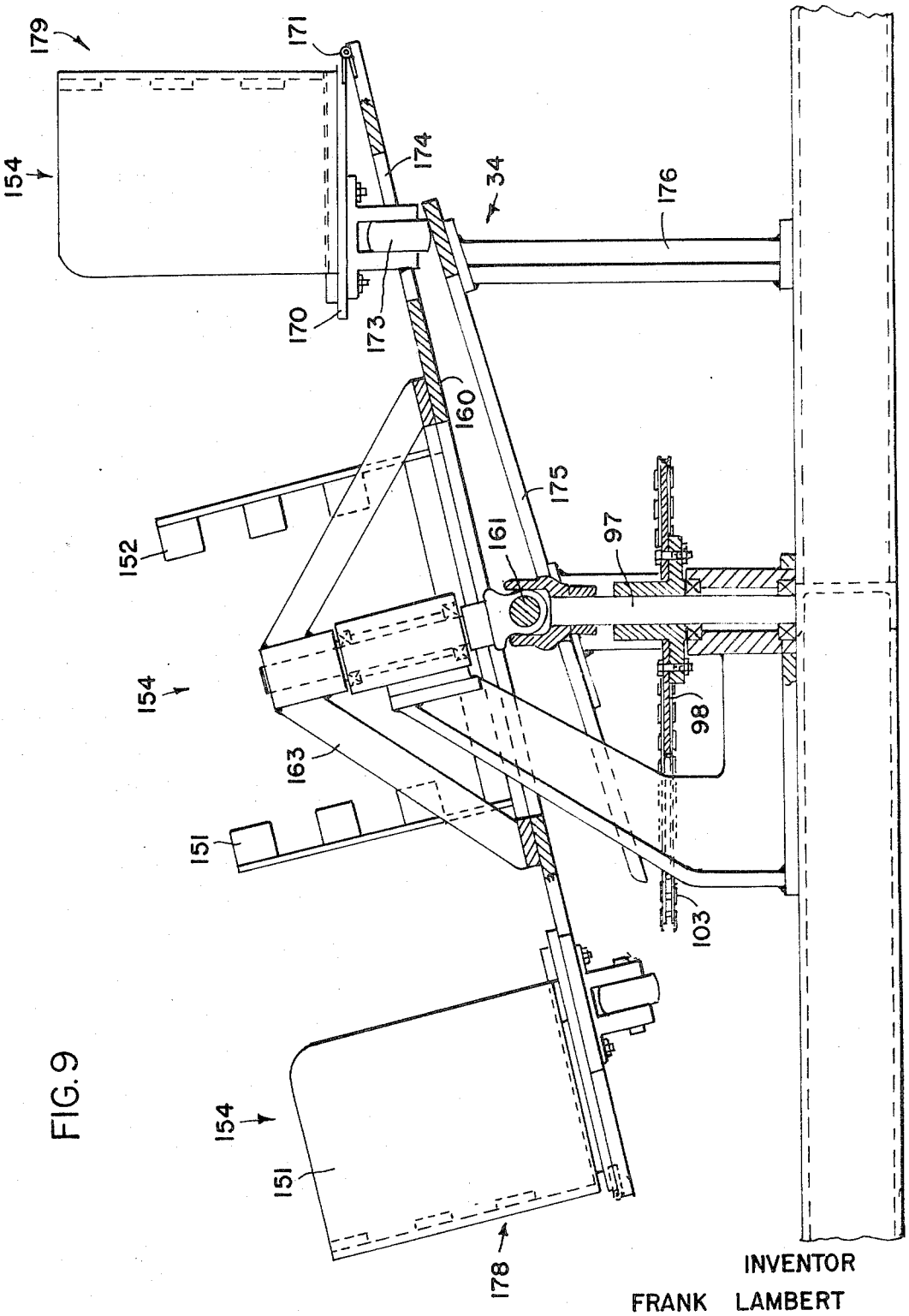
FIG. 9 is a cross-sectional elevation of the bag holding carousel.
Figure 10:
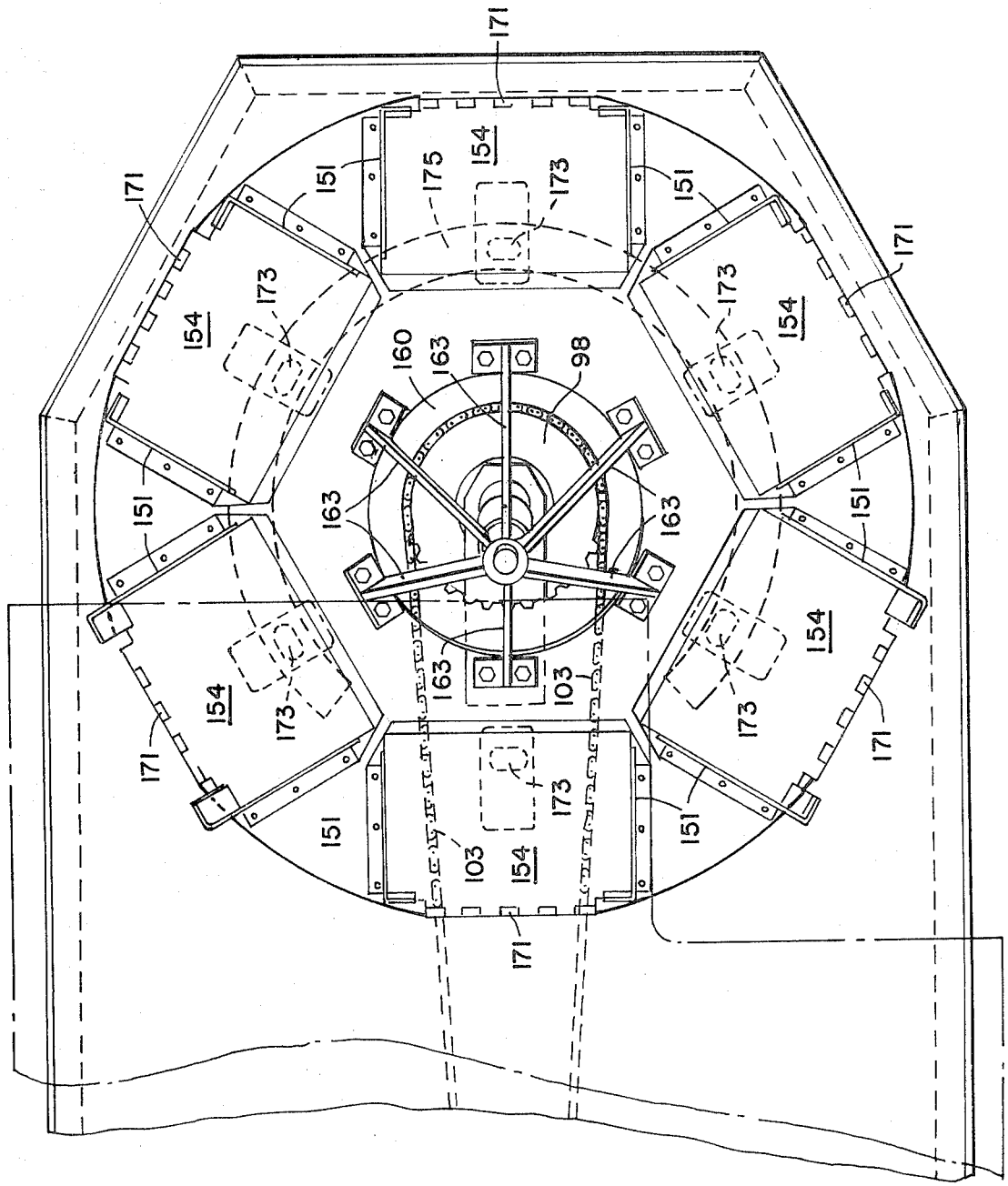
FIG. 10 is a top plan view of the bag-holding carousel.

Once the bag 107 has been filled, as previously described, the member 114A is tilted from the position shown in solid outline in FIG. 6 to a position shown in dotted outline at 136. This arrangement or movement is attained by a hydraulic means 137. One end of this hydraulic member 137 is secured to the elevator 135, and the other end is pivotally connected to a flange 139 at the upper end of the member 114A. On actuation of hydraulic member 137, the member 114A is pivoted in a clockwise direction. The member 114A as it moves from the position shown in solid outline in FIG. 6 to the position in dotted outline, passes between opposed brackets 151 and 152, (FIG. 9) of the properly aligned receiving cradle 154. Thus, the bag 107 will be deposited and engaged by this cradle. These cradles 154, which are preferably six in number, are supported on the carousel 34.

The delivery carousel 34 consists essentially of a platform 160 upon which six cradles 154, of the type previously described, are supported. The platform 160 is supported for rotation by shaft 97 through chain and sprocket drive 103, 98 as previously described with the shaft 97 connected to the carousel 94 by universal joint 161. Suitable frame means 163 may be provided. The cradles 154 are each individually supported on a base 170 that is pivotally supported at the outer periphery of the carousel 34 by pivot means 171. The inner end of each base 170 is supported on a roller bearing 173 that extends through a slot 174 in the platform 160 with the bottom of the roller bearing 173 engaging platform 175. Platform 175 is rigidly supported on legs 176 and is secured at an acute angle relative to the plane of carousel 34. Thus, as the shaft 97 rotates the carousel 34 about its axis, the cradles 154 are moved from a position at the low end 178 at which the bags are received in a position in which the cradles are substantially vertical with respect to the plane of the platform 160 to a position in which the cradles 154 are vertical with respect to the floor at point 179. Further, the cradles 154 are raised to a more convenient carrying level at point 179.

An arrangement may be provided wherein the rotary carousel is eliminated and groceries are moved from a feed position to a bundling position. The filled bags are then fed to a receiving position and the receiving carousel if desired. A belt 200 suitably continuously driven and extending lengthwise of surface 3 is provided for fragile products that must bypass the carousel operation.

I claim:
1. A checkout counter apparatus for groups of articles of varying shape, size and weight comprising:
    means for holding a group of articles;
    means for positioning said holding means for individual checking of said articles; and
    means for receiving said checked articles at a checking position and thereafter discharging said articles at a bundling position including:
    a carousel having means defining at least two oppositely disposed recesses for accommodating articles,
    means located adjacent a bottom opening in one recess for moving articles into the recess located near the checking position and means located adjacent a bottom opening of the other recess for moving articles out of the recess located near the bundling position,
    a moveable wall means disposed in each recess, and
    means intercoupling said wall means responsive to movement of articles against the wall of said one recess to cause the wall of said other recess to force articles in said other recess to be discharged to said bundling position.
2. A checkout counter apparatus as set forth in claim 1 wherein said carousel has means defining four recesses disposed at 90° positions about the carousel.
3. A checkout counter apparatus as set forth in claim 2 having belt means disposed adjacent a bottom opening of each of the four recesses wherein the belt means associated with two of the diametrically opposed recesses remain stationary.
4. A checkout counter apparatus as set forth in claim 1, wherein said means for moving includes a belt and pulley means for supporting and causing rotation of said belt.
5. A checkout counter apparatus as set forth in claim 4 wherein said belts rotate in the same direction.
6. A checkout counter apparatus as set forth in claim 1 wherein said means intercoupling said wall means includes a rigid shaft attached at opposite ends to said wall means disposed in said recesses, and means for supporting said rigid shaft for longitudinal movement.
7. An automatic checking and packaging system as set forth in claim 1 including a magazine for a stack of bags, means for removing one bag at a time from said magazine, and means for opening one bag at a time for positioning at said bundling position.
8. An automatic checking and packaging system as set forth in claim 7 wherein said means for opening said bags includes a plurality of vacuum plates adapted to engage opposite sides and secure under vacuum opposite walls of a flexible bag and means for moving apart said vacuum plates when engaging said walls.
9. An automatic checkout and packaging system as set forth in claim 7, wherein said means for supporting removable containers includes means for receiving said containers on a side with the opening in said container positioned to receive articles moving horizontally and means moving said container to a position with the opening thereof directed upwardly.
10. An automatic checking and packaging system as set forth in claim 7 including means for supporting a container with its opening upright when articles are contained therein and means for receiving and storing a plurality of said container having articles therein.

* * * * *